S. S. MATTHES.
EXPANSION BOLT.
APPLICATION FILED SEPT. 12, 1921.

1,434,394.

Patented Nov. 7, 1922.

Inventor
Samuel S. Matthes.

Witness
H. J. Stromberger.

By
Attorney

Patented Nov. 7, 1922.

1,434,394

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

EXPANSION BOLT.

Application filed September 12, 1921. Serial No. 500,027.

*To all whom it may concern:*

Be it known that I, SAMUEL S. MATTHES, a citizen of the United States of America, residing at Mansfield, in the county of Richland and State of Ohio, have invented certain new and useful Improvements in Expansion Bolts, of which the following is a specification.

My invention relates to an expansion bolt for attachment to brick, stone, wood, etc., and has for its object an arrangement whereby the attaching means may be varied relative to the support so that the article to be attached may be adjusted to or from the support.

In the drawing accompanying this specification—

Figure 1:
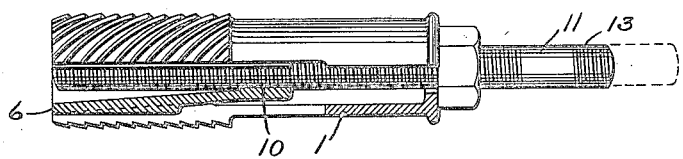
Fig. 1 shows a plan view of the bolt in partial section with the parts ready to coact to expand the outer member. The dotted line shows the stud as adjustable longitudinally of the device.
Figure 2:
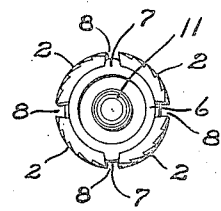
Fig. 2 is an end view of the device.
Figure 3:
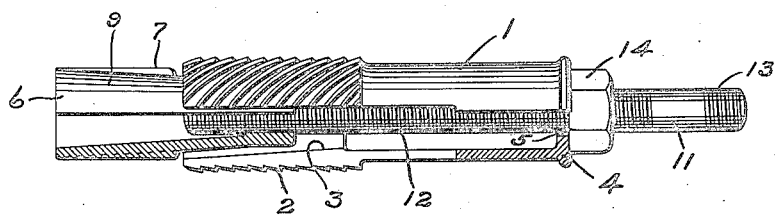
Fig. 3 is also a plan view similar to Fig. 1 but with the expander and outer member separated to better show their construction.

In the preferred form of my invention I have a hollow expanding shell 1 having one end slotted to form four tongues 2 which permits that end to be easily expanded. The inner face 3 of each tongue is tapered as shown and the other end formed with a flange 4, having an opening 5 to receive a support stud.

In the slotted end of the shell is located an expander 6 provided with wings 7 which are located in the slots 8 and prevent relative rotation of the shell and expander. The outer face 9 of the expander is tapered to correspond to the tapered face of the tongues and as the two are moved toward each other in a longitudinal direction the shell will be expanded at its slotted end after the faces have contacted. The expander is hollow and provided with a threaded portion 10 adapted to receive a threaded stud, by means of which the expander may be moved longitudinally of the shell.

The stud 11 is provided with threads 12 either throughout its length or for a portion and the thread engages with the threads 10 on the expander. The stud shows one end 13 threaded separate from the threading 12 and to which an article to be supported is secured. Mounted on the stud is a nut 14 by means of which the expander is drawn into the shell and which prevents the expander from moving outward and the device loosening from its support when once installed. By making the nut free to rotate on the stud, it is possible to adjust the distance the stud projects outward from the shell after the device has been installed in its support and the article to be secured to the stud may be located at proper distance from the support. If the nut 14 were an integral part of the stud, the device could still be installed but the stud could not be adjusted into or out of the shell for the purpose set forth above.

To install the device a hole is made in the support, as for instance a mine roof, to receive the shell which is inserted therein. The nut is rotated to move the stud outward and simultaneously drawing the expander into the shell and expanding the inner end of the shell into engagement with the side of the hole in the mine roof. After this operation is completed, if the threaded portion 13 is not projecting as desired relative to the face of the mine roof, the nut 14 may be backed off slightly and the stud 11 rotated to bring the projection 13 as desired and the nut is then rotated into engagement with the face 4 of the shell and the device is ready to receive the article to be attached thereto.

Having described and illustrated the preferred form of my invention, what I desire to cover by United States Letters Patent is:—

Claims:

1. An expanding bolt comprising an expansible member, an expander within the expansible member, a supporting member coacting with the expander and projecting without the expansible member, having means coacting with the expander to vary the projection of the supporting member when rotated and rotatable means on the supporting member acting when rotated relative to the supporting member to move the expander relative to the expansible member and permitting the projection of the supporting member from the expansible member to be increased without changing the position of the rotatable means relative to the expansible member.

2. An expanding bolt comprising an expansible member, an expander within the expansible member, a supporting member having a threaded engagement with the expander and projecting without the expansible member and arranged to have its projection varied, and means rotatably mounted on the threaded portion of the supporting member acting when rotated on and relative to the supporting member to move the expander relative to the expansible member and permitting the projection of the supporting member from the expansible member to be changed.

3. An expanding bolt comprising an expansible member, an expander within the expansible member, a supporting member having a threaded engagement with the expander and projecting without the expansible member and arranged to have its projection varied and means rotatably mounted on the threaded portion of the supporting member acting when rotated relative to the supporting member to move the expander and supporting member longitudinally to the expansible member and permitting adjustment of the supporting member longitudinally of the expansible member when the supporting member is rotated relative to the expander after the expander is in final position relative to the expansible member without changing the relative position of the expander and expansible member.

4. An expanding bolt comprising an expandible member, an expander slidably mounted within the expandible member, a supporting member having a threaded engagement with the expander and projecting from the expandible member, said projection being variable when the supporting member is rotated relative to the expander, means rotatably mounted on the said threaded portion of the supporting member and movable longitudinally thereof when rotated, said means arranged to move the expander in one direction when rotated on the supporting member and to prevent movement of the expander in the other direction and attaching means on the supporting member.

5. An expanding bolt comprising an expandible shell, an expander slidably mounted within the expandible shell, a supporting member projecting from the expandible shell and having a threaded engagement with the expander to move longitudinally thereof when rotated relative thereto to vary the projection, adjusting means rotatably mounted on the said threaded portion of the supporting member and movable longitudinally thereof when rotated relative thereto and simultaneously move the expander and supporting member longitudinally of the expandible shell and permit the re-adjustment of the supporting member when the supporting member is rotated without changing the position of the expander relative to the expandible shell.

In testimony whereof I affix my signature.

SAMUEL S. MATTHES.